Fig. 1

March 24, 1953 A. J. HORNFECK 2,632,599
THERMOSTATIC CONTROL SYSTEM USING POTENTIOMETERS
Filed Jan. 31, 1946 3 Sheets-Sheet 2

FIG. 2

INVENTOR.
ANTHONY J. HORNFECK
BY
Raymond D. Junkins
ATTORNEY

Patented Mar. 24, 1953

2,632,599

UNITED STATES PATENT OFFICE 2,632,599

THERMOSTATIC CONTROL SYSTEM USING POTENTIOMETERS

Anthony J. Hornfeck, Cleveland Heights, Ohio, assignor to Bailey Meter Company, a corporation of Delaware Application January 31, 1946, Serial No. 644,517

5 Claims. (Cl. 236—15)

My invention relates to control systems and particularly to electrical control circuits utilizing a measurement of a variable quantity, condition, or the like as the motivating basis for a control of the same or of another variable. A condition, quantity, position, or other variable which may be represented by an electrical value, such as resistance, potential or other electrical characteristic, may be continuously and instantaneously measured through the agency of the circuit to be described. The measurement so obtained may be used to effect a control of the same or of another variable which may or may not contribute to the magnitude or change in magnitude of the variable being measured.

Representative of variable quantities, conditions and the like, to which my invention is directed, are such variables as rate of fluid flow, temperature, liquid level, pressure, and the like, although the variable may equally as well be the position in space of an object, the throttling position of a valve, or the like.

In the control of combustion or of other processes the time of response (process lag) of the system to a corrective change in the rate of application of an agent, following a departure of the controlled condition from its desired value, depends on various constructional and operating factors. Overtravel, hunting, or the like of a control system results in inefficiency, waste, and excessive wear on equipment. To satisfactorily control the operation of different processes and apparatus, several basic types of control are known and are widely used in pneumatic and hydraulic control systems. A principal object of my present invention is the embodiment in electrical and electronic circuits of certain desirable features of control readily adaptable to a wide variety of processes to be controlled.

In the control art two general types of control are recognized which may be classified as "on-off" and "modulating." The type of control applicable in any particular case depends upon the conditions incident to that case, as will be appreciated by those familiar with the art. In on-off control the controlled element (a valve for example) is either open or closed. In modulating control the valve is positioned between its extremes of travel to modulate or throttle the rate of flow of fluid through the valve. It is to modulating control that my present invention is particularly directed.

In a "geared" control, for each and every value of the variable within a preselected range, there exists a predetermined rate of supply of the corrective agent. That is to say there is a definite relation between the magnitude of the variable and the rate of supply of the corrective agent, and hence the rate of supply of corrective agent may be said to be geared to the variable. Such control is particularly stable and does not tend to set up a hunting cycle in the system such as would cause the variable to oscillate. In some instances however it is unsatisfactory in that it does not maintain the variable at a predetermined magnitude, but permits variations therein depending upon the load on the system.

In a "floating" control, upon a departure of the variable from desired value, the rate of supply of corrective agent is continuously varied until the variable returns to the desired value. There is no relation between magnitude of the variable and rate of supply of corrective agent. In some instances such control results in an unstable system which sets up oscillations in the magnitude of the variable. On the other hand it does so control the rate of supply of the corrective agent as to maintain the variable exactly at desired value.

A continuing change in load or other operating condition usually causes the input and output to balance out at a value above or below the "standard" or "control point" desired. This discrepancy or drift is sometimes termed "droop."

In combustion and process control the response of the controlled factor is usually slow with changes in regulator position and system load. Fast acting floating or narrow band proportioning control will generally produce considerable overshoot and even sustained cycling in such systems. Wide band proportional or geared regulators will result in considerable drift of the control variable from standard with changes in system load.

Automatic reset or "droop correction" control is well known in pneumatic systems for process control. Fundamentally the method consists of a combination of fast acting proportional control with a slow acting floating control which supplies the reset action to restore the control quantity to standard. The response speed of the reset control is proportional to both the extent of deviation and the length of time of deviation from standard. The order of magnitude of the response time may be many minutes, depending on the sluggishness of the process system.

Antihunt circuits and devices are well known in electric control to overcome unstability caused by time lags produced by such factors as mechanical inertia and electrical inductance. Such antihunt devices generally comprise time delay networks consisting of resistances and capacities or inductances which couple some function of the regulator output to the input circuit in such a way as to stabilize the control. The relatively short time constants of these devices compared to the response time of most processes make them generally unsuitable for reset control elements in the process control field.

It is a particular object of my present invention to provide improved electrical circuits useful in control of various processes to maintain variables or other conditions at the desired value or relationship.

Figure 1:
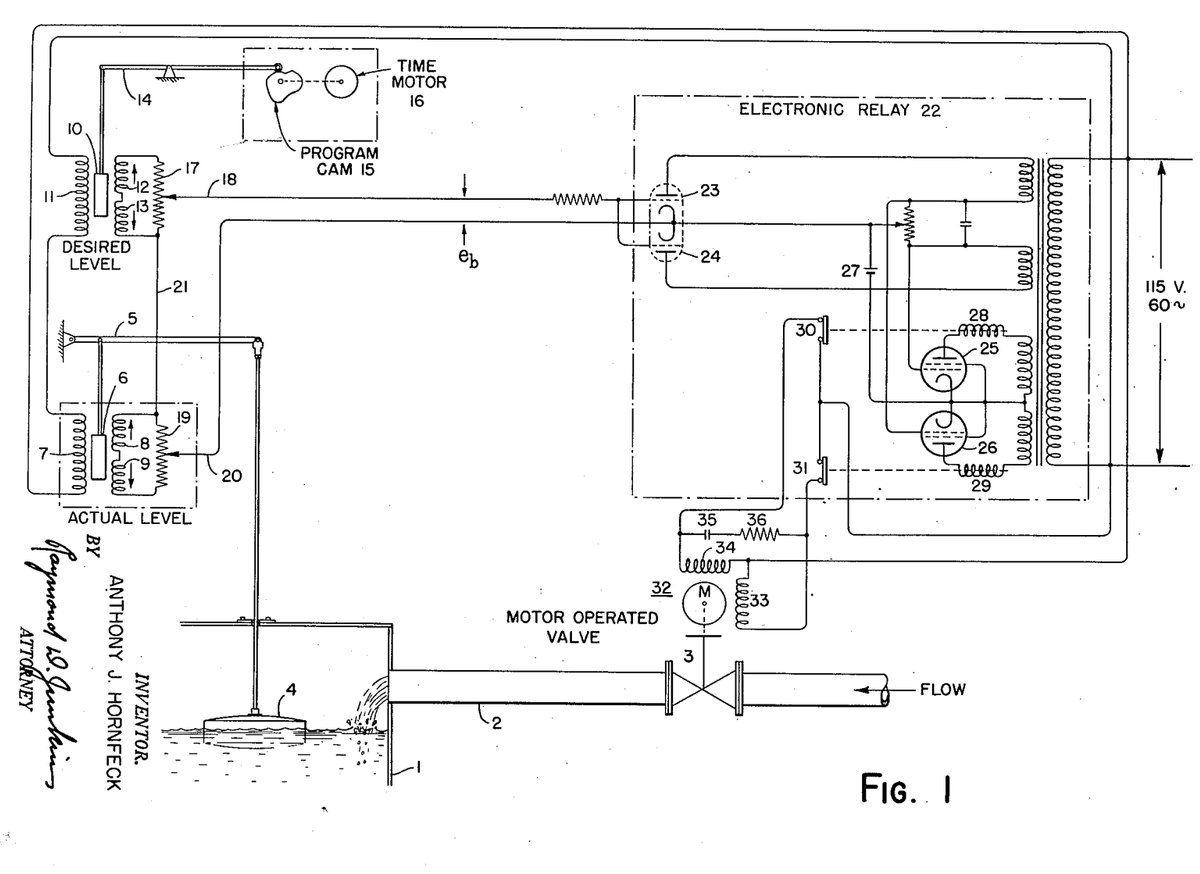
Fig. 1 is a circuit diagram of a liquid level control representative of a "floating control."

Referring now particularly to Fig. 1, I show therein a liquid holding container 1 in which it is desired to maintain a predetermined uniform or programmed liquid level. It is assumed that there is a discharge from or usage of liquid out of the tank 1, and that a supply or replenishment of the liquid is made in controllable amount through a conduit 2 under regulation of a motor operated valve 3.

The position of a float 4 riding the surface of the liquid within the tank is transmitted through linkage 5 to vertically position a magnetic core piece 6 relative to windings 7, 8 and 9. The elements 6, 7, 8 and 9 comprise a movable core transformer with the core 6 coupling an energized primary winding 7 to the bucking secondary windings 8, 9. Voltage is induced in the secondaries 8, 9 dependent upon the vertical (on the drawing) positioning of the core 6. Within its limits of motion the position of the core 6 relative the windings 7, 8 and 9 is representative of actual level of the liquid within the tank 1. Thus the voltage condition of the windings 8, 9 is likewise representative of the actual liquid level.

A similar movable core transformer comprising the elements 10, 11, 12 and 13 produces a voltage condition in the bucking secondary windings 12, 13 representative of desired liquid level by the positioning of the core 10 vertically (on the drawing) through the agency of linkage 14 positioned by a program cam 15 which may be revolved by a time motor 16. A uniform level may be dictated by positioning the cam 15 to a desired position and thereafter not rotating the motor 16. A time program of levels may be attained by properly shaping the cam 15 and continuously driving it by the time motor 16 through the necessary gear reduction.

Across the secondaries 12, 13 is connected a resistor 17 adjustably contacted by the terminal of a conductor 18. Similarly across the secondaries 8, 9 is connected a resistor 19 adjustably contacted by the terminal of the conductor 20. When the core 6 is in a neutral position relative the windings 7, 8, 9 a voltage $E_1=0$ exists across the windings and resistor 19. When the core is moved from neutral position toward one end of the coil assembly a voltage $E_1$ is developed as a function of core position. The relation is linear over the operating range. In similar manner a voltage $E_2$ will be developed across the windings 12, 13 when the core 10 is moved from its neutral position. The contacts 18, 20 are movable respectively along the resistances 17 and 19 for calibrating purposes.

The circuit including the windings 8, 9, 12, 13, the resistances 17, 19 and the conductors 18, 20, 21 comprise a balanceable network of the null type. When the network is in balance the voltage across the conductors 18, 20, namely, $e_b=0$. When the network is unbalanced through movement of either core 6 or 10 the direction and extent of such unbalance is evidenced by an alternating current of plus phase or of minus phase across the conductors 18, 20, and by a voltage $e_b$ representative of the extent of unbalance.

Irrespective of the level of liquid within the tank 1, if the actual level is the desired level then the system is in balance. Under such condition the position of the core 6 relative the windings 7, 8, 9 produces an induced voltage between the conductors 20, 21 the same as that produced across the conductors 18, 21 by the core piece 10 inductively coupling the windings 11, 12, 13; and these induced voltages cancel or balance out to a result that $e_b=0$.

If the actual level departs from the desired level then an unbalance exists between the voltage representative of actual level and that representative of the desired level and the resultant voltage $e_b$ is of a phase and magnitude representative of the direction and extent of unbalance. At 22 I diagrammatically show an electronic relay to which the unbalance voltage $e_b$ is applied for control of the motor operated valve 3.

The voltage $e_b$ is applied to a double triode 23, 24 for firing control of a pair of shield grid Thyratrons 25, 26. When the measuring network is at balance and voltage $e_b=0$ both 23, 24 are conducting and imposing a negative voltage on the grids of the Thyratrons 25, 26. I include in the circuit however a D.-C. bias 27, for example battery 27, sufficient to at least overcome such negative grid voltage (existing at balance) and to therefore allow both Thyratrons to fire, energizing relays 28, 29 so that the contacts 30, 31 are closed, resulting in a plugging of the motor 32.

When the measuring system is unbalanced the phase and magnitude of the voltage $e_b$ determines which of the triodes 23 or 24 increases in current passage and which decreases. The anodes of Thyratrons 25, 26 are 180° out of phase while their grids are connected together and are in phase. The one (23 or 24) which increases will drive the grid of one Thyratron (25 or 26) more negative, and it will cease firing. This will cause the related relay 28 or 29 respectively to become deenergized, thus opening the contact 30 or 31 for rotation of the motor 32 in proper direction to correct the cause of the unbalance.

The motor 32 is of an alternating current type having windings 33 and 34 ninety electrical degrees apart and also having a capacitor 35. When alternating current passes directly through one of the windings and simultaneously through the other winding in series with the capacitor, the motor rotates in predetermined direction. The resistance 36 is advisable to limit condenser surge current through the contacts 30 or 31. However, the value of resistance 36 is so small that it does not affect the phase or operation of the motor 32.

It will be seen that when a condition of balance exists in the measuring network and voltage $e_b=0$ both Thyratrons 25, 26 are fired, both relays 28, 29 are energized, both contacts 30, 31 are closed, and the motor 32 is plugged. Upon an unbalance of the measuring circuit in one direction the motor 32 will rotate in predetermined direction until voltage $e_b$ is again equal to zero, at which time both contacts 30 and 31 are closed and the motor plugged to a stop.

The system illustrated in Fig. 1 is representative of a "floating" control wherein there is no definite throttling position of the valve 3 for each value of level of the liquid in tank 1. There is nothing that tends to balance the electrical measuring circuit and make $e_b=0$ until the level of the liquid returns to the desired level.

The operation of the system as a whole is as follows. Assume that the level of the liquid in the tank 1 is correct as dictated by the position of the core 10. The measuring network is in balance and the output voltage $e_b=0$. Triodes 23, 24 pass current equally and both Thyratrons 25, 26 are fired. The relays 28, 29 are energized and the contacts 30, 31 are closed. The motor 32 is plugged to a stop, leaving the valve 3 in a throttling position, such that the rate of fluid inflow to the tank 1 equals the rate of fluid outflow therefrom. So long as this condition exists the entire system is in balance.

Assume now that the demand upon the tank 1 suddenly increases. The level of liquid falls, lowering the float 4 (and core 6) and varying the alternating current induced in the bucking secondary windings 8, 9 from the energized primary 7. The position of the core 10 not having changed, it is evident that the output of the secondaries 8, 9 will be different than that of the secondaries 12, 13; the measuring network will be unbalanced and the voltage $e_b$ will be greater than zero. The voltage $e_b$ will be of predetermined phase under this condition. The magnitude of the voltage $e_b$ will depend upon the extent of the discrepancy between the actual level and the desired level as represented by the relative positions of cores 6 and 10. There is no speed control of the motor 32 but the magnitude of the voltage $e_b$ serves to determine the time of operation of the motor.

As the voltage $e_b$ of one phase causes one of the Thyratrons to cease firing, the related contact is opened and the motor 32 rotates in proper direction to open the valve 3, thereby tending to increase the rate of supply of liquid through the conduit 2 and return the level toward desired value.

If the increased rate of liquid outflow persists, then the rate of liquid inflow must be increased not only to equal the new rate of liquid outflow, but additionally to bring the level back to predetermined level. The result will perhaps be an overshooting or hunting. As previously mentioned, "floating" control is frequently susceptible to overtravel and hunting, but has the decided advantage of attempting to return the variable to the exact desired value.

Should the rate of liquid outflow decrease, with corresponding increase in level within the tank 1, then the voltage $e_b$ will be of opposite phase, resulting in a rotation of the motor 32 in opposite direction to tend to close the valve 3 and reduce the level of the liquid to the desired value.

Assume that there is no deviation in rate of liquid outflow, nor any disturbing influence affecting the rate of liquid inflow, there still is a condition resulting in unbalance, but purposely so. I refer to the possibility of a programmed desired level. It is immaterial whether the unbalance of the measuring circuit occurs through a variation in actual level caused by discrepancy between inflow and outflow or by way of a change in desired level. The unbalance voltage $e_b$ will be of a phase dependent upon the direction of unbalance and will result in an opening or closing of the valve 3 to attempt to correct the condition.

As previously pointed out, the system provides a "floating" control wherein there is no geared or fixed valve opening position for each value of liquid level, but a floating relationship therebetween.

While I have described the circuit arrangement of Fig. 1 as specifically relating to the control of liquid level, it will be understood that this is representative only and the system is equally applicable to the control of other variables, such as rate of flow, temperature, pressure, or the like. The point is that the departure of the actual value of the variable from the value desired will result in a corrective change of the controlled factor or agent in an attempt to return the departed variable to the desired value.

While I have shown the unbalance voltage $e_b$ as controlling a motor operated valve 3, through the agency of an electronic relay 22, it is equally possible to apply the unbalance voltage $e_b$ to various commercial types of electric controllers, such for example as the G. E. Reactrol described in Patents 2,266,569, 2,285,172, 2,285,173 and 2,383,806, or the G. E. Thymotrol described in Patent 2,312,117.

Figure 2:
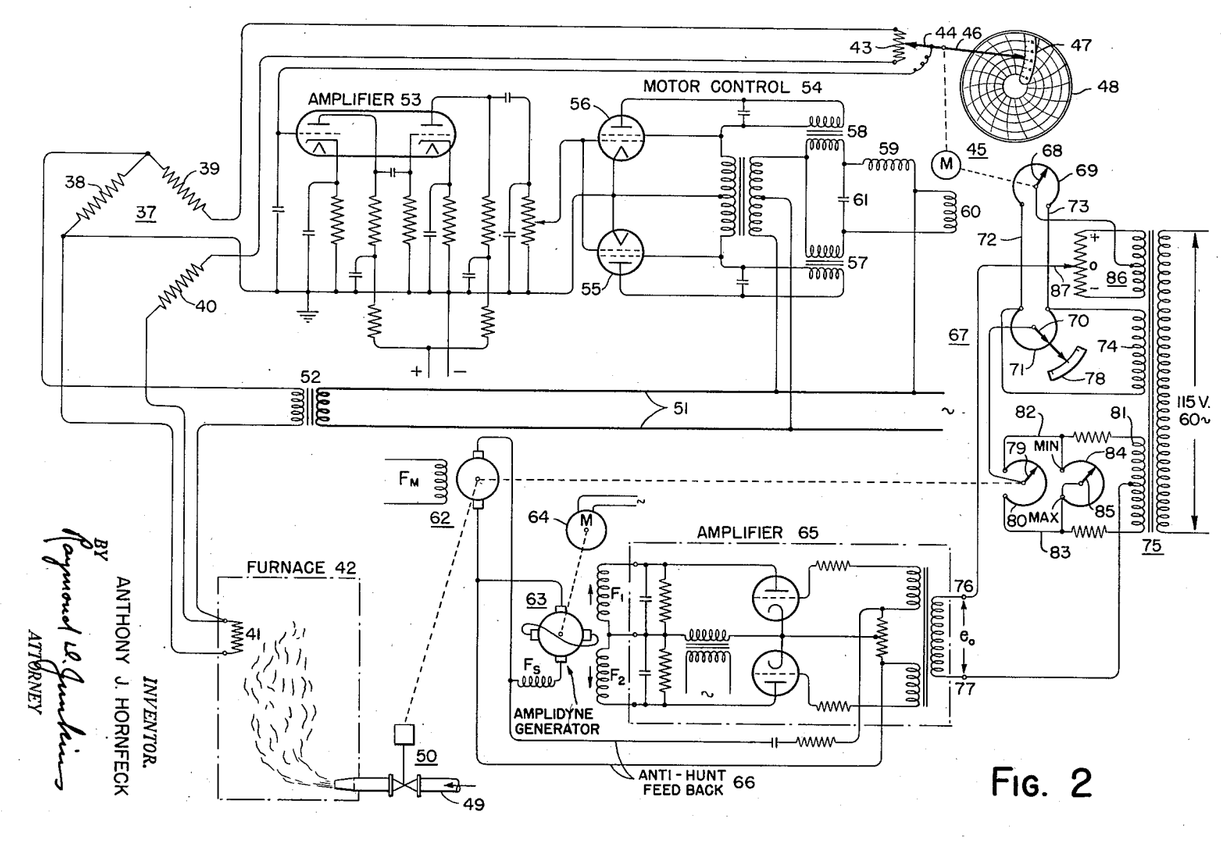
Fig. 2 is a circuit diagram of a temperature control system representative of a "geared" control.

I will now explain my invention as embodied in Fig. 2, which depicts a "geared" control of a fuel fired furnace for maintaining temperature therein at a desired value or in returning such temperature toward the desired value upon departure therefrom.

I indicate at 37 a phase sensitive alternating current bridge having fixed resistor arms 38, 39 and 40. The fourth arm 41 of the bridge 37 is a resistance element located in a furnace 42 and sensitive to the temperature thereof. For balancing the measuring network I provide an adjustable resistance 43 proportioned between the arms 39 and 40 by a movable contact arm 44. For positioning the contact arm 44 I provide a motor 45 which also positions an indicator 46 relative to a scale 47 and relative to a revoluble chart 48, thereby providing an instantaneous indication as well as a continuous record of the value of temperature to which the resistance arm 41 is sensitive.

The furnace 42 is preferably heated by the application thereto of fuel supplied through a conduit 49 under the control of a valve 50. The bridge 37 is supplied from an alternating current source 51 through a transformer 52.

Preferably the bridge arm 41 is a platinum resistance measuring element. The conjugate corners of the bridge 37 are connected to an amplifier 53 and motor control 54 for the motor 45. For an understanding of a phase sensitive alternating current bridge, for measuring the resistance of the leg 41 subjected to the temperature of the furnace 42, reference may be had to the Ryder Patents 2,275,317 and 2,333,393. The conjugate voltage supplied to the amplifier 53 assumes a balance or unbalance and a phase relation relative to the supply voltage dependent upon the magnitude and sense of the unbalance condition of the bridge. The amplifier 53 selectively controls motor tubes 55, 56 which in turn control the amount and direction of unbalance of saturable core reactors 57 and 58 for directional and speed control of the motor 45 adapted to position the arms 44 and 46.

The motor 45 is of an alternating current type having windings 59 and 60 ninety electrical degrees apart and also having a capacitor 61. When alternating current passes directly through one of the windings and simultaneously through the other winding in series with the capacitor, the motor rotates in predetermined direction and at a speed determined by the extent of unbalance of the saturable core reactors 57 and 58. It is not necessary to go into greater detail as to the construction and operation of the amplifier 53 and the motor control circuit 54, as reference may be had to the above mentioned Ryder patents.

In my present invention, in addition to providing an instantaneous indication and a continuous record of the value of temperature to which the arm 41 is subjected, I provide an electrical control of the heat input through the conduit 49 to the furnace 42. For control of the throttling valve 50 I show a direct current motor 62 energized by an amplidyne generator 63, such as is described in Patent 2,227,992 of commercial form. The generator is driven by a motor 64 and its output is regulated by selective regulation of field coils $F_1$, $F_2$ under the control of an electronic amplifier 65. The amplifier 65 is in turn controlled by the motor 45 of the measuring circuit. Thus upon departure of temperature within the furnace 42 from that which is desired, the valve 50 is positioned in an opening or closing direction to increase or decrease the supply of the elements of combustion to the furnace tending to return the departed temperature to its desired value. The actual temperature is continuously indicated on the scale 47 and recorded on the chart 48. An antihunt feedback circuit 66 ties the amplidyne generator 63 and its driven motor 62 to the amplifier 65.

Intermediate the measuring circuit and the amplifier 65 I interpose a control circuit 67. The motor 45 positioning the contact arm 44 simultaneously positions a contact arm 68 over a slide-wire 69. At 70 I indicate a contact arm adapted to be manually positioned along a slide-wire 71 for establishing the temperature standard to which the control works, i. e. the temperature value which is desirably to be maintained at the sensitive bridge arm 41.

The elements 68, 69, 70 and 71 comprise what I term a balanceable control bridge including the joining conductors 72, 73. This circuit is supplied with alternating current power through the secondary winding 74 of a transformer 75. Contact arm 68 is positioned relative to the slide-wire 69 by the motor 45 representative of actual temperature to which the resistance arm 41 is sensitive. The contact arm 70 is manually positioned along the slide-wire 71 to a point representing the desired temperature. The control circuit including these elements then establishes a signal $e_0$ across the terminals 76, 77 of the amplifier 65 of reversible phase and having a magnitude proportional to the unbalance of the control circuit. Such signal, through the amplifier 65, controls the output of the amplidyne generator 63 and consequently the positioning of the driven motor 62 in proper direction, amount and speed to desirably position the valve 50.

The feedback voltage developed in the circuit 66 is of a derivative type developed only during change in speed of the motor 62. It is proportional to the acceleration or deceleration of the motor 62 and is effective only during change in rate of speed of the motor. Its effect is to accelerate the growth or decay in speed of the motor 62. It acts as a bias on the phase discriminatory tubes of the amplifier 65 and thereby on the bucking fields $F_1$ and $F_2$ of the amplidyne generator 63, whose output is the power source for the D.-C. motor 62.

The "control point" as it is sometimes termed in this art is the desired or "standard" temperature value indicated on a scale 78 by hand adjustment of the contact pointer 70 along the slide-wire resistance 71.

In "proportional position" or "geared" control there is a continuous linear relation between the position of the final control element and the value of the controlled variable. In other words, a continuous linear relation between the throttling position of the valve 50 and of the contact arm 68 along the slide-wire 69 (representative of actual temperature at the element 41).

The motor 62, positioning the valve 50, is shown as additionally positioning a contact arm 79 along a slide-wire 80 so that the position of the arm 79 is continuously representative of the throttling position of the valve 50.

Between the "standard setter" contact arm 70 and the terminal 77 I interpose a voltage network adapted to modify or oppose the unbalance voltage which may exist in the control bridge comprising the elements 68, 69, 70, 71, 72 and 73. The interposed network includes a center tap secondary 81 of the transformer 75, the slide-wire 80, and joining conductors 82, 83. The phase and magnitude of the effective voltage of this network is determined by the positioning of the contact arm 79 along the slide-wire 80 and thus representative of the position of the valve 50. Interposing such voltage in series with the unbalanced voltage between the arms 68, 70 produces a voltage $e_0$ across the terminals 76, 77 which is a resultant of said two voltages, and when the two voltages are equal, and thereby cancel out, then the voltage $e_0=0$ and the motor 62 stops moving the valve 50 and the arm 79.

When actual temperature departs from desired temperature a voltage of corresponding phase and magnitude is established in the control bridge 67. This voltage is applied across the terminals 76, 77 resulting in a movement of the motor 62 in proper direction and at a related speed to position the valve 50 in proper direction to tend to return the actual temperature to the desired value. Simultaneously the motor 62 positions the contact arm 79 along the resistance 80, thereby establishing a voltage of phase and magnitude opposing the voltage established by the control bridge 67 until the voltage $e_0=0$, whereupon the motor 62 stops.

The position of the contact arm 68 is representative of actual temperature. The position of the contact 79 is representative of position of the valve 50. When the arm 79 has been so positioned that the system is balanced and $e_0=0$ then the position of the arm 79 (representative of the position of valve 50) is directly related to the position of the arm 68 (representative of actual temperature) so that there is a definite valve opening position for every value of temperature within a given "control band."

The "proportional band" or "control band" is that temperature variation across the "control standard" necessary for full travel of the valve 50. In other words, the amount of travel of the arm 79 over the slide-wire 80 (corresponding to full travel of the valve 50) equivalent to a given angular movement of the arm 68 over the slide-wire 69 (representative of a band of temperature at any location in the range of the instrument). Inasmuch as the gearing is preferably so arranged that full travel of the valve 50 results in full movement of the arm 79 across the slide-wire 80 in fixed or invariable relation, I have arranged that such full mechanical movement of arm 79 over 80 will be adjustably equivalent to a desired voltage output between the arm 79 and the center tap of the secondary 81.

Such a "band width adjustment" is provided by spanning the conductors 82, 83 with a slide-wire resistance 84 having a hand positionable contact 85 movable between two terminals of the resistance 84 marked on the drawing MAX and MIN.

When the arm 85 is at MIN the slide-wire 84 is shorted out by direct connection between the conductors 82 and 83, and the "control band" width may be said to be zero. In other words, full travel of the valve 50 might be accomplished upon the slightest deviation in temperature from the standard and the system would operate as a full "floating" control.

As the arm 85 is moved along the resistance 84 from MIN toward MAX, thus introducing resistance of the slide-wire 84 into the circuit, the "control band" is widened so that a greater temperature variation is necessary for full travel of the valve 50. Thus I have clearly provided for adjusting the control band width manually without otherwise interfering with the operation of the measuring or control circuit.

Figure 3:
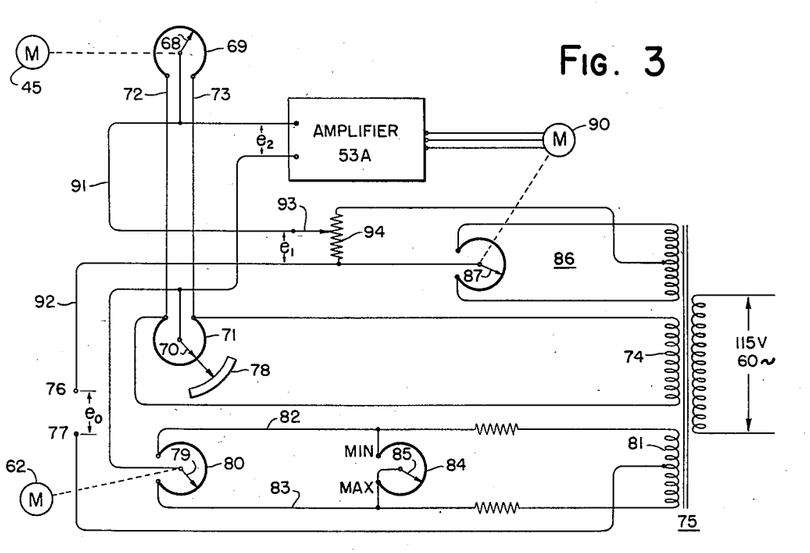
Fig. 3 is a circuit diagram of a temperature control representative of a "proportional plus reset" or "standardizing" control system.

As a hand adjustable bias to the control bridge, I provide a voltage circuit 86 having a manually positionable contact arm 87. This provides a possibility of adjustment at the time of installation to take care of characteristics of the system as well as of the furnace, etc. If, upon installation, it is found that under normal operating conditions there is a slight "drift" of the actual temperature either above or below the desired temperature the bias voltage output of 86 can be increased or decreased so that under preferred operating conditions the normal drift is eliminated. Obviously under widely varying operating conditions the drift or "droop" may vary from positive to negative, and preferably this is corrected automatically. Such an automatic "droop corrector" is illustrated in Fig. 3.

The operation of the system illustrated in Fig. 2 is as follows. Assume that the entire system is in balance and that the temperature of the furnace is that which is desired. If the temperature within the furnace deviates from the desired value, the resistance of the bridge arm 41 changes, causing an unbalance of the bridge 37 in one direction or the other, dependent upon whether the actual temperature is above or below the desired temperature. The phase and magnitude of the A.-C. output of the bridge 37 follows the sense and amount of unbalance of the bridge and is applied to the amplifier 53 for control of the motor 45. The motor 45 rotates in predetermined direction an amount determined by the phase and amount of unbalance of the bridge 37 and positions the contact 44 along the slide-wire 43 in proper direction to rebalance the bridge. The amount of movement of the contact 44 over the slide-wire 43 to bring about such a rebalancing is representative of the deviation of the actual temperature from the desired temperature, and therefore the indicator 46 continuously shows on the index 47 and chart 48 the actual temperature of the furnace.

At the same time, the motor 45 has positioned the contact 68 along the slide-wire 69 in consonance with the departure of actual temperature from desired temperature. With such movement of the contact arm 68 the control bridge including the elements 68, 69, 70, 71, 72 and 73 becomes unbalanced and an electrical value $e_0$ is established across the terminals 76, 77 representative of the direction and magnitude of the deviation or unbalance. Such signal is effective, through the amplifier 65, to position the valve 50 in proper direction to return the temperature of the furnace toward the desired standard. Simultaneously the contact arm 79 is moved over the slide-wire 80 in proper direction and extent until the control circuit 67 is balanced. Thereafter the motor 62 ceases to move the valve 50 and the contact 79. The result is that the valve 50 has assumed a position directly related to the actual temperature within the available motion and within the characteristics of the various elements of the system.

As the temperature (due to a change in heating of the furnace) returns toward desired value the consequent temperature change at the resistance 41 unbalances the bridge 37 in opposite direction and causes the motor 45 to position the contacts 44 and 68 in proper direction and amount until the measuring bridge 37 and the control bridge are again in balance. It is appreciated, of course, that this action may be more or less continuous, that is before the temperature returns completely to its desired standard there may be other influences acting upon the furnace to prevent or to accelerate the return of the temperature to the desired value. In other words, the measuring circuit is continuously indicating the instantaneous temperature of the furnace and the control circuit is continuously regulating the fuel admission to the furnace to maintain the temperature at the desired value or standard, or to attempt to return it toward that value. It is a characteristic of such a geared or proportional system, however, that the system will stabilize out at a temperature different from the desired value, and this discrepancy (either above or below the desired value) is known as "drift" or "droop." As the geared range is reduced toward zero or contacts on each side toward the desired standard the system approaches a floating control wherein there is no definite valve opening position for each temperature across the control point. The system of Fig. 2 is known as a "proportional control" because the movement of the valve 50 is proportional to the deviation from standard of the actual temperature.

In Fig. 3 I show a portion only of Fig. 2 modified to include a "reset" or automatic droop corrector. Essentially the arrangement is the same as that of Fig. 2 except that the contact arm 87 is automatically positioned by a motor 90 under the control of an amplifier 53A sensitive to unbalance of the control bridge. The system provided in Fig. 3 is known in the art as "proportional plus reset control" providing continuous automatic correction for drift of the actual temperature away from desired temperature, or in other words a correction for the tendency of such a proportional control to stabilize out at some temperature other than the desired or standard temperature.

As previously pointed out (in connection with

Fig. 2) a proportional or positioning or geared type of control inherently has a definite valve opening position or rate of application of an agent corresponding to each value of the controlled variable. Thus, if temperature in the furnace falls, the unbalance created thereby will result in an increase in rate of firing until a balance is attained, but the new rate of firing is only able to prevent a further unbalance of the system, resulting in a stabilizing of the system at some new and lower temperature. Nothing urges the system to give that extra small amount of fuel input which would be required to return the temperature to the standard value. In other words, there is nothing about the system which continues to call for an increase in rate of supply of fuel so long as the actual temperature is away from the desired temperature. The system calls for an increase in the rate of supply of fuel only so long as it is unbalanced. As soon as balance occurs no further change is made in the rate of firing even though the temperature is not returned to the desired value. It is this discrepancy between the actual temperature at which such a system balances out and the actual desired or standard temperature that is known as drift or droop. It is a particular object of the modification shown in Fig. 3 to provide a continuous and automatic correction in the system to continuously tend to return the actual temperature toward the desired temperature.

Referring to the cntrol circuit 67 of Fig. 2, the balanceable network including the elements 68, 69, 70, 71, 72 and 73 is in overall condition balanced by the bridge including the elements 79, 80, 81, 82, 83, 84 and 85, although neither of the two bridges may of itself be balanced. When an unbalance occurs in the first bridge it results in a movement of the motor 62, which in turn positions the contact 79 until the effect of the second bridge counteracts that of the first bridge and $e_0 = 0$. It is a particular object of my invention as depicted in Fig. 3 to provide that so long as there is any unbalance in the first of the two bridges, such unbalance will be continuously effective to prevent $e_0$ from going to zero. In other words, so long as there is any discrepancy between the actual value of temperature and the desired value of temperature there is an unbalance of the first bridge, and so long as such a discrepancy exists there is drift which should be corrected. Therefore so long as such a discrepancy exists it is my desire to utilize it in continuously imposing its effects upon the value of $e_0$ so that the motor 62 will not stop moving until the actual temperature is returned to the desired temperature value.

I have shown an amplifier 53A (similar to the amplifier 53) connected directly across the contacts 68, 70 and sensitive therefore to any unbalance of the first control bridge. The amplifier 53A is used to control the direction and speed of rotation of a motor 90, which in turn positions the contact arm 87, imposing an unbalance voltage in the conductor 91, 92 joining the contact arm 68 with the terminal 76. The arrangement is such that the voltage $e_1$ introduced into the conductor 91, 92 is of the same phase as the unbalanced voltage between the contacts 68, 70 thereby amplifying the same and preventing it from returning to zero until the voltage $e_2$ applied to the amplifier 53A equals zero.

Inasmuch as the direction of rotation of the motor 90 depends upon the phase of the voltage $e_2$ and its speed of rotation depends upon the magnitude of said voltage, thus the rate of change in the voltage $e_1$ depends upon the extent and time of deviation of the actual temperature from the desired temperature. If such deviation is of considerable magnitude then the motor 90 will rotate in proper direction at a relatively high speed, thus increasing the voltage $e_1$ at a high rate. As the voltage $e_2$ decreases toward zero the speed of the motor 90 decreases correspondingly and the value of the imposed voltage $e_1$ decreases proportionately to the end that when $e_2 = 0$, then $e_1 = 0$.

The effect of this is that so long as there is a discrepancy between the actual temperature and the desired temperature, even though an overall balance of the electrical system exists, there is a voltage $e_1$ additive to the voltage $e_2$ to comprise the voltage $e_0$. Only when the voltage $e_2$ is reduced to zero will the voltage $e_1$ be at zero, and therefore the voltage $e_0$ at zero.

By making the contact arm 93 manually movable along the resistance 94 I provide a reset sensitivity adjustment basically varying the relationship between the voltage $e_2$ and the voltage $e_1$. In other words, the range of magnitude of $e_1$ may be the same as the range possibility of $e_2$ or it may be 50% thereof, or in desired relationship, depending upon the movement of the arm 93 along the resistance 94.

Figure 4:
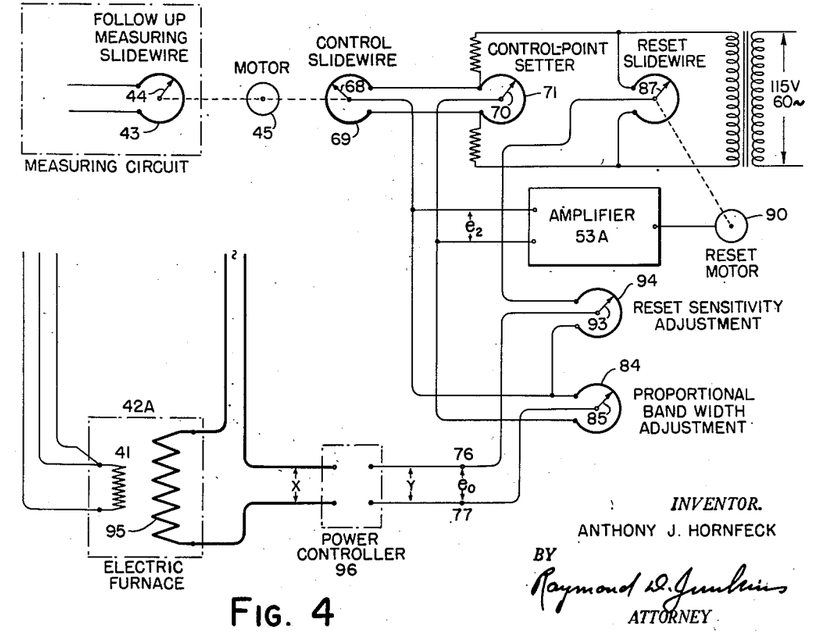
Fig. 4 is a modification of Fig. 3.

In Fig. 4 I show a modification somewhat similar to that of Fig. 3 in that it depicts a proportional plus reset control, but differs from Fig. 3 in certain respects.

Herein the furnace 42A is shown as being heated by electric resistance elements 95 whose heating value is continuously controlled by a power controller 96, which may be of the previously mentioned Reactrol type. It is sufficient to indicate that the power output X is continuously proportional to the input Y, in turn related to the signal $e_0$ across the terminals 76, 77. On this premise it therefore becomes unnecessary to provide any tieback between the heat input and the control circuit, such for example as the elements 79, 80 of Figs. 2 and 3. The system is still of the basic proportional, positioning, or geared type wherein there is a definite power supply X to the furnace for every value of temperature as shown by the position of the contact 44 along the slide-wire 43 and corresponding position of the control contact 68 along the control slide-wire 69.

I show the amplifier 53A sensitive to $e_2$ (unbalance of the elements of the network 68, 69, 70 and 71) for operating the reset motor 90 to position the reset slide-wire contact 87 and thereby continually varying the voltage applied to the control bridge so long as the voltage $e_2$ is other than zero. The effect is similar to that explained in connection with Fig. 3.

While I have chosen to illustrate and describe certain preferred embodiments of my invention it will be understood that this is by way of example only and not to be considered as limiting.

What I claim as new, and desire to secure by Letters Patent of the United States, is:

1. Apparatus for connection between the power element of a device for measuring the value of a variable and a controller for the rate of application of an agent to correct said value comprising in combination, a bridge comprising a pair of parallel connected potentiometers each having a slider, a transformer secondary energizing said potentiometers, one of said sliders being adapted for actuation by said power element and the other arranged for setting to a desired value for said variable, a circuit connecting said sliders to the said controller for applying thereto a potential variable in phase and amplitude substantially in keeping with the deviation of the value of the variable from the desired value, a third potentiometer having a slider, a second secondary energizing the last potentiometer and having a center tap, said tap and slider being connected in series in said circuit to supply a potential therein to automatically compensate for "droop"; means responsive to the magnitude and phase of said first or deviation potential to actuate said third slider to provide said compensation, a fourth potentiometer having a slider, a third secondary energizing the last potentiometer and having a center tap, said last mentioned slider and tap being connected in series in said circuit to supply a potential therein representative of the position of said controller, and means adapted for mechanically connecting said last slider and said controller.

2. Apparatus for connection between the power element of a device for measuring the value of a variable and a controller for the rate of application of an agent to correct said value including in combination, a bridge comprising a pair of parallel connected potentiometers each having a slider, a transformer secondary energizing said potentiometers, one of said sliders being adapted for actuation by said power element and the other arranged for setting to a desired value for said variable, a circuit connecting said sliders to the said controller for applying thereto a potential variable in phase and amplitude substantially in keeping with the deviation of the value of the variable from the desired value, a third potentiometer having a slider, a second secondary energizing the last potentiometer and having a center tap, said tap and slider being connected in series in said circuit to supply a potential therein to automatically compensate for "droop"; means responsive to the magnitude and phase of said first or deviation potential to actuate said third slider to provide said compensation, a fourth potentiometer having a slider, a third secondary energizing the last potentiometer and having a center tap, said last mentioned slider and tap being connected in series in said circuit to supply a potential therein representative of the position of said controller, means adapted for mechanically connecting said last slider and said controller, a resistor and slider shunting said fourth potentiometer to provide manual adjustment of the width of the "control band," and a single primary for energizing all of said secondaries to maintain proper phase relations.

3. A furnace control system including, in combination, a burner for fluid fuel, a valve for controlling the delivery of fuel, a motor for modulating said valve, a continuously indicating thermometer for said furnace having a power element movable in direct response to temperature changes, a balanceable bridge comprising two A.-C. energized potentiometers having their ends connected, a slider for each potentiometer, one being adjustable to indicate a desired furnace temperature and the other being connected for movement by said power element to indicate the actual furnace temperature, a circuit connecting said sliders and energized therefrom to a potential indicative by phase and magnitude the deviation of actual from desired temperature, a phase and magnitude sensitive amplifier connected between said circuit and motor to control the speed and direction of the latter, a third potentiometer energized by a transformer secondary, a slider on said last mentioned potentiometer, a center tap on said secondary, said center tap and slider being connected in said circuit to oppose the potential therein, a mechanical connection between said last mentioned slider and said motor to balance the potential in said circuit and stop the motor when the valve setting is that required for the desired temperature, and a slider on a fourth potentiometer and the center tap of another secondary connected in series in said circuit whereby appropriate setting of the slider will correct "drift."

4. A furnace control system including, in combination, a burner for fluid fuel, a valve for controlling the delivery of fuel, a motor for modulating said valve, a continuously indicating thermometer for the furnace having a power element movable in direct response to temperature changes, a balanceable bridge comprising two A.-C. energized potentiometers having their ends connected, a slider for each potentiometer, one being adjustable to indicate a desired furnace temperature and the other being connected for movement by said power element to indicate the actual furnace temperature, a circuit connecting said sliders and energized therefrom to a potential indicative by phase and magnitude of the deviation of actual from desired temperature, a phase and magnitude sensitive amplifier connected between said circuit and motor to control the speed and direction of the latter, a third potentiometer energized by a transformer secondary, a slider on said last mentioned potentiometer, a center tap on said secondary, said center tap and slider being connected in said circuit to oppose the potential therein, a mechanical connection between said last mentioned slider and said motor to balance the potential in said circuit and stop the motor when the valve setting is that required for the temperature, a fourth potentiometer and center-tapped energizing secondary, a slider on said fourth potentiometer and said center tap being connected in said circuit to correct "drift," a motor to actuate said last mentioned slider, and a phase and magnitude sensitive amplifier in control of said last mentioned motor, said amplifier being energized directly from the first two mentioned sliders.

5. Apparatus for the control of a second variable by the measurement of a first variable comprising in combination, an element which moves to positions corresponding to instantaneous values of the first variable; a controller for the value of the second variable, said controller including a part whose position is representative of the value of said variable; an A.-C. energized bridge having an output conjugate conductor and adjustable resistors; one of said resistors being adjustable to indicate the desired value of said first variable; said element being connected to adjust another resistor to correspond in value to the instantaneous value of the first variable; means associating said controller and said conjugate conductor whereby unbalanced potential and phase changes in the latter actuate the former; means to introduce into said conjugate conductor a potential adjustable in amplitude and phase to automatically correct for drift in the value of the first variable comprising an A.-C. energized potentiometer having an adjustable slider; a motor controlled in direction and speed only by the bridge unbalance potential in said conjugate conductor; a mechanical connection between said motor and adjustable slider; means provided to apportion the output of the A.-C. energized potentiometer to the conjugate conductor, said means being manually adjustable to effect "reset sensitivity"; and means to balance the bridge by reducing the potential in the output conjugate conductor to zero comprising, an energized potentiometer having a slider, means to introduce the selected output of the potentiometer into the said conjugate conductor in a direction to oppose that therein, and a mechanical drive for said last mentioned slider from said controller part.

ANTHONY J. HORNFECK.

REFERENCES CITED

The following references are of record in the file of this patent:

UNITED STATES PATENTS

| Number | Name | Date |
|---|---|---|
| 2,119,061 | Stein | May 31, 1938 |
| 2,208,623 | Bond | July 23, 1940 |
| 2,208,761 | Hartig | July 23, 1940 |
| 2,246,686 | Jones | June 24, 1941 |
| 2,300,537 | Davis | Nov. 3, 1942 |
| 2,390,793 | Jones | Dec. 11, 1945 |
| 2,420,415 | Bristol | May 13, 1947 |
| 2,446,163 | Wannamaker | July 27, 1948 |
| 2,452,311 | Markusen | Oct. 26, 1948 |